US011452153B2

(12) United States Patent
Knauer et al.

(10) Patent No.: US 11,452,153 B2
(45) Date of Patent: Sep. 20, 2022

(54) PAIRING AND GATEWAY CONNECTION USING SONIC TONES

(71) Applicant: LISNR, Inc., Cincinnati, OH (US)

(72) Inventors: William Knauer, Erlanger, KY (US); Ian Andrew Birnam, Richmond, CA (US); Austin Andrew Teames, Pleasanton, CA (US); Joshua Matthew Glick, Columbus, OH (US); Rodney B. Williams, Cincinnati, OH (US)

(73) Assignee: LISNR, Inc., Cincinnati, OH (US)

( * ) Notice: Subject to any disclaimer, the term of this patent is extended or adjusted under 35 U.S.C. 154(b) by 0 days.

(21) Appl. No.: 15/864,797

(22) Filed: Jan. 8, 2018

(65) Prior Publication Data

US 2018/0132298 A1   May 10, 2018

Related U.S. Application Data

(63) Continuation-in-part of application No. 14/398,675, filed as application No. PCT/US2013/039079 on May 1, 2013, now Pat. No. 11,126,394.
(Continued)

(51) Int. Cl.
*H04W 76/14* (2018.01)
*H04B 11/00* (2006.01)
(Continued)

(52) U.S. Cl.
CPC ............ *H04W 76/14* (2018.02); *H04B 11/00* (2013.01); *H04W 4/80* (2018.02); *H04W 12/06* (2013.01);
(Continued)

(58) Field of Classification Search
CPC ......... H04N 21/8106; H04N 21/41407; H04N 21/8358; H04N 21/42203; H04N 21/6581;
(Continued)

(56) References Cited

U.S. PATENT DOCUMENTS 5,159,703 A   10/1992 Lowery
5,335,250 A   8/1994 Dent et al.
(Continued)

FOREIGN PATENT DOCUMENTS

CN   103 023 583 B   4/2015
EP   1758308 A1   2/2007
(Continued)

OTHER PUBLICATIONS

Min, G. et al., "Performance Analysis of Different Phase Shift Keying Modulation Schemes in Aeronautical Channels", Jun. 2009.
(Continued)

*Primary Examiner* — Michael Won
(74) *Attorney, Agent, or Firm* — Wood Herron & Evans LLP (57) ABSTRACT

A networkable device is coupled to a wireless IP gateway or paired to a personal area network (PAN) via the use of a sonic tone, which may be a human audible tone, which encodes a symbol sequence representing a binary message useful for implementing connection to a wireless IP gateway or pairing with a PAN. In one embodiment the sonic tone conveys a media access controller (MAC) address, to facilitate connection and/or pairing. Alternatively, or in addition, the sonic tone may encode a Service Set Identifier (SSID) and password for connection to a wireless network (Wi-Fi), or a BLUETOOTH (IEEE 802.15.1) identifier and/or PIN for connection to a BLUETOOTH (IEEE 802.15.1) PAN. In particular implementation of this embodiment the tone is produced by the IP gateway and used to initiate Wi-Fi connection, and/or the tone is produced by the master device of a PAN to initiate BLUETOOTH (IEEE 802.15.1) connection.

24 Claims, 2 Drawing Sheets

Related U.S. Application Data (60) Provisional application No. 61/781,107, filed on Mar. 14, 2013, provisional application No. 61/640,900, filed on May 1, 2012.

(51) Int. Cl.
*H04W 4/80* (2018.01)
*H04W 12/06* (2021.01)
*H04W 76/11* (2018.01)
*H04W 84/12* (2009.01)
*H04L 9/40* (2022.01)
*H04W 12/43* (2021.01)

(52) U.S. Cl.
CPC .......... *H04W 76/11* (2018.02); *H04L 63/083* (2013.01); *H04W 12/43* (2021.01); *H04W 84/12* (2013.01)

(58) Field of Classification Search
CPC ............ H04M 1/505; H04M 1/2155; H04M 2250/12; H04M 1/72572; H04W 4/80; H04W 76/11; H04W 76/14; H04W 12/06; H04W 12/43; H04W 84/12; H04W 84/18; H04B 11/00; H04L 63/083
USPC ..................................................... 709/217
See application file for complete search history.

(56) References Cited

U.S. PATENT DOCUMENTS

| | | | |
|---|---|---|---|
| 5,485,839 A | 1/1996 | Aida et al. | |
| 5,565,921 A | 10/1996 | Sasaki et al. | |
| 5,764,763 A | 6/1998 | Jensen et al. | |
| 5,889,870 A | 3/1999 | Norris | |
| 5,923,252 A | 7/1999 | Sizer et al. | |
| 5,995,512 A | 11/1999 | Pogue, Jr. | |
| 6,301,368 B1 | 10/2001 | Bolle et al. | |
| 6,511,426 B1 | 1/2003 | Hossack et al. | |
| 6,570,500 B1 | 5/2003 | Pieper | |
| 6,664,913 B1 | 12/2003 | Craven et al. | |
| 6,891,482 B2 | 5/2005 | Craven et al. | |
| 6,912,319 B1 | 6/2005 | Barnes et al. | |
| 6,947,893 B1 | 9/2005 | Iwaki et al. | |
| 7,334,735 B1 | 2/2008 | Antebi et al. | |
| 7,904,946 B1 | 3/2011 | Chu et al. | |
| 7,995,197 B2 | 8/2011 | Sikora et al. | |
| 8,140,331 B2 | 3/2012 | Lou | |
| 8,401,569 B1* | 3/2013 | Bell ...................... | H04M 1/505 367/135 |
| 8,532,644 B2 | 9/2013 | Bell et al. | |
| 8,544,753 B2 | 10/2013 | Antebi et al. | |
| 8,711,656 B1* | 4/2014 | Paulson ............... | H04B 7/2603 367/135 |
| 8,976,959 B2* | 3/2015 | Duplan .................... | H04K 1/06 380/35 |
| 8,983,089 B1* | 3/2015 | Chu ....................... | H04R 3/005 381/58 |
| 8,989,779 B1* | 3/2015 | Centore, III .......... | H04W 4/021 455/456.3 |
| 9,024,998 B2 | 5/2015 | Chu et al. | |
| 9,111,326 B1 | 8/2015 | Worley, III et al. | |
| 9,213,969 B2 | 12/2015 | Arentz | |
| 9,318,166 B2 | 4/2016 | Sharon et al. | |
| 9,361,444 B2 | 6/2016 | Antebi et al. | |
| 9,513,861 B2* | 12/2016 | Lin ....................... | H04W 76/14 |
| 9,766,702 B2 | 9/2017 | Cieplinski et al. | |
| 9,912,415 B2 | 3/2018 | Tsfaty et al. | |
| 10,044,448 B2* | 8/2018 | Mufti ..................... | H04B 13/00 |
| 10,826,623 B2 | 11/2020 | Prince et al. | |
| 2001/0049788 A1 | 12/2001 | Shur | |
| 2002/0008615 A1 | 1/2002 | Heide et al. | |
| 2002/0152045 A1 | 10/2002 | Dowling et al. | |
| 2003/0206602 A1 | 11/2003 | Yamamoto | |
| 2003/0217269 A1 | 11/2003 | Gantman et al. | |
| 2004/0111360 A1 | 6/2004 | Albanese | |
| 2005/0008325 A1 | 1/2005 | Ollis et al. | |
| 2005/0171649 A1 | 8/2005 | Adachi | |
| 2005/0177361 A1 | 8/2005 | Srinivasan | |
| 2005/0190768 A1 | 9/2005 | Cutler | |
| 2006/0041759 A1 | 2/2006 | Kaliski et al. | |
| 2006/0136544 A1* | 6/2006 | Atsmon ................... | A63H 3/28 709/200 |
| 2006/0138231 A1 | 6/2006 | Elberbaum | |
| 2007/0153091 A1 | 7/2007 | Wallington et al. | |
| 2007/0220544 A1 | 9/2007 | Nash-Putnam | |
| 2007/0272750 A1 | 11/2007 | Bjorklund | |
| 2008/0071537 A1 | 3/2008 | Tamir et al. | |
| 2008/0134264 A1 | 6/2008 | Narendra et al. | |
| 2008/0157938 A1 | 7/2008 | Sutardja | |
| 2008/0165022 A1 | 7/2008 | Herz et al. | |
| 2008/0173717 A1 | 7/2008 | Antebi et al. | |
| 2008/0227436 A1* | 9/2008 | Gantman ............... | G06Q 30/02 455/414.2 |
| 2008/0228498 A1* | 9/2008 | Gasque ............... | A01M 31/002 704/276 |
| 2009/0019061 A1 | 1/2009 | Scannell, Jr. | |
| 2009/0088133 A1* | 4/2009 | Orlassino ................ | H04L 63/08 455/411 |
| 2009/0210789 A1 | 8/2009 | Thakkar et al. | |
| 2010/0034474 A1 | 2/2010 | Crucs | |
| 2010/0053169 A1 | 3/2010 | Cook | |
| 2010/0149022 A1 | 6/2010 | Fam et al. | |
| 2010/0165879 A1* | 7/2010 | Gupta ................. | H04L 12/2807 370/254 |
| 2010/0280641 A1 | 11/2010 | Harkness et al. | |
| 2010/0305449 A1 | 12/2010 | Wegener et al. | |
| 2010/0331689 A1 | 12/2010 | Wegener | |
| 2011/0029359 A1 | 2/2011 | Roeding et al. | |
| 2011/0099295 A1 | 4/2011 | Wegener | |
| 2011/0124399 A1 | 5/2011 | Dutilly et al. | |
| 2011/0143677 A1 | 6/2011 | Jung et al. | |
| 2011/0164595 A1* | 7/2011 | So ......................... | H04W 12/06 370/338 |
| 2011/0179182 A1 | 7/2011 | Vadla Ravnas | |
| 2011/0295691 A1 | 12/2011 | Krieter | |
| 2011/0301439 A1 | 12/2011 | Albert et al. | |
| 2012/0051187 A1* | 3/2012 | Paulson ................ | H04B 11/00 367/135 |
| 2012/0064874 A1 | 3/2012 | Pierce, Jr. et al. | |
| 2012/0084131 A1 | 4/2012 | Bergel et al. | |
| 2012/0089461 A1* | 4/2012 | Greenspan ............ | G06Q 20/12 705/14.58 |
| 2012/0134238 A1 | 5/2012 | Surprenant et al. | |
| 2012/0179525 A1* | 7/2012 | Seguin ............... | G06Q 30/0207 705/14.16 |
| 2012/0197738 A1 | 8/2012 | Wakabayashi | |
| 2012/0209949 A1 | 8/2012 | Deliyannis et al. | |
| 2012/0214416 A1 | 8/2012 | Kent et al. | |
| 2012/0232906 A1 | 9/2012 | Lindahl | |
| 2012/0295560 A1* | 11/2012 | Mufti ..................... | H04B 13/00 455/95 |
| 2013/0078988 A1 | 3/2013 | Bell et al. | |
| 2013/0079057 A1 | 3/2013 | Bell et al. | |
| 2013/0082850 A1 | 4/2013 | Takeshima | |
| 2013/0106977 A1 | 5/2013 | Chu et al. | |
| 2013/0176984 A1 | 7/2013 | Koezuka | |
| 2013/0185137 A1 | 7/2013 | Shafi et al. | |
| 2013/0262539 A1 | 10/2013 | Wegener | |
| 2013/0273968 A1 | 10/2013 | Rhoads et al. | |
| 2013/0279300 A1 | 10/2013 | Iwase et al. | |
| 2014/0039654 A1 | 2/2014 | Akiyama et al. | |
| 2014/0045586 A1 | 2/2014 | Allen et al. | |
| 2014/0050321 A1 | 2/2014 | Albert et al. | |
| 2014/0101738 A1 | 4/2014 | Sama | |
| 2014/0129232 A1 | 5/2014 | Jones et al. | |
| 2014/0140503 A1 | 5/2014 | Duplan et al. | |
| 2014/0172141 A1 | 6/2014 | Mangold | |
| 2014/0273811 A1* | 9/2014 | Czapla ................... | H04H 20/61 455/3.06 |
| 2014/0369527 A1 | 12/2014 | Baldwin | |
| 2015/0113094 A1 | 4/2015 | Williams et al. | |

(56) References Cited

U.S. PATENT DOCUMENTS

| | | | |
|---|---|---|---|
| 2015/0256391 A1* | 9/2015 | Hardy | H04W 12/35 |
| | | | 709/222 |
| 2015/0297193 A1 | 10/2015 | Rothberg et al. | |
| 2015/0309151 A1 | 10/2015 | Shibata et al. | |
| 2016/0072803 A1* | 3/2016 | Holz | G06F 21/42 |
| | | | 726/7 |
| 2016/0142157 A1 | 5/2016 | Jeong et al. | |
| 2016/0373430 A1 | 12/2016 | Bhat et al. | |
| 2017/0279542 A1 | 9/2017 | Knauer et al. | |
| 2017/0279571 A1 | 9/2017 | Melodia et al. | |
| 2018/0167147 A1 | 6/2018 | Almada et al. | |
| 2018/0329676 A1 | 11/2018 | Williams et al. | |
| 2019/0096412 A1 | 3/2019 | Knauer et al. | |
| 2019/0190621 A1 | 6/2019 | Prince et al. | |
| 2019/0204409 A1 | 7/2019 | Booij et al. | |
| 2019/0253101 A1 | 8/2019 | Kilian et al. | |
| 2019/0268078 A1 | 8/2019 | Okunev et al. | |
| 2020/0014685 A1* | 1/2020 | Hardy | H04L 67/10 |

FOREIGN PATENT DOCUMENTS

| | | |
|---|---|---|
| EP | 2847984 A1 | 3/2015 |
| EP | 3207639 A1 | 8/2017 |
| EP | 3358811 A1 | 8/2018 |
| JP | 06090296 A | 3/1994 |
| JP | 2001-320337 A | 11/2001 |
| JP | 2003-1744404 A | 6/2003 |
| JP | 2003-324491 A | 11/2003 |
| JP | 2007-164659 A | 6/2007 |
| JP | 2008-293393 A | 12/2008 |
| JP | 2011-141784 A | 7/2011 |
| JP | 2012-525655 A | 10/2012 |
| KR | 10-1136279 B1 | 4/2012 |
| RU | 2326495 C2 | 6/2008 |
| WO | 2002/45273 A2 | 6/2002 |
| WO | 2005/122483 A1 | 12/2005 |
| WO | 2013-129587 A1 | 9/2013 |
| WO | 2013-166158 A1 | 11/2013 |
| WO | 2014-069617 A1 | 5/2014 |
| WO | 2014-104284 A1 | 7/2014 |
| WO | 2016/061353 A1 | 4/2016 |
| WO | 2016/123047 A1 | 8/2016 |
| WO | 2019/067861 A1 | 4/2019 |

OTHER PUBLICATIONS

Chitode, J.S. Communication Theory. 2002. Technical Publications. Prune. 5-28. Sec. 5-6 near 5-7 Source Coding Theorem Shannon's First Theorem). (Year: 2002).

Lee et al.; Chirp Signal-Based Aerial Acoustic Communication for Smart Devices; 2015.

* cited by examiner

PAIRING AND GATEWAY CONNECTION USING SONIC TONES

CROSS REFERENCE TO RELATED APPLICATIONS

This application is a continuation-in-part of U.S. patent application Ser. No. 14/398,675, which was filed as PCT Application Serial No. US/2013/039079 on May 1, 2013, and published in the United States on Apr. 23, 2015 as Publication US2015-0113094, and claims benefit of U.S. Provisional Patent Application Ser. Nos. 61/781,107 filed Mar. 14, 2013 and 61/640,900 filed May 1, 2012, each of which is incorporated herein by reference in its entirety.

TECHNICAL FIELD

This application generally relates to systems and methods for using sonic tones to communicate digitized information, and specifically the use of sonic tones in wireless connection or pairing of a networkable device to a wireless network.

BACKGROUND OF THE INVENTION

Various proposals have been made to broadcast sonic tones to convey digital information, either independently or with audio content that is broadcast or played back audibly in a public or private environment. The sonic tone is typically designed for reception and decoding by a networkable device 1002, such as a networkable device. For example, the sonic tone may be embedded in audio content that is received by a microphone of the networkable device 1002. The source of the signal may be any audio speaker within the proximity of the networkable device, or the audio content may be supplied for decoding by an on-board audio generating application, such as music player module, or an on-board video player application, such as video player module, or provided to a line-out port (such as a headphone jack) of a networkable device 1002, or provided to an external speaker of the networkable device 1002.

Example systems and methods for embedding sonic tones into audio content are provided in the above-referenced PCT Application, as well as the following US patent applications, the entirety of which applications is hereby incorporated by reference in their entirety: U.S. patent application Ser. No. 13/286,613 entitled "SYSTEM EFFECTIVE TO MODULATE A CODE AND PROVIDE CONTENT TO A USER" filed Nov. 1, 2011, U.S. patent application Ser. No. 13/286,670 entitled "SYSTEM EFFECTIVE TO DEMODULATE A MODULATED CODE AND PROVIDE CONTENT TO A USER" filed September Nov. 1, 2011, U.S. patent application Ser. No. 13/286,727 entitled "DEVICE EFFECTIVE TO MODULATE A CODE AND TO PROVIDE CONTENT TO A USER" filed Nov. 1, 2011, U.S. patent application Ser. No. 15/081,158 entitled "LOCAL TONE GENERATION" filed Mar. 15, 2016, U.S. patent application Ser. No. 15/719,164 entitled "HIGH BANDWIDTH SONIC TONE GENERATION" filed Sep. 28, 2017, and U.S. patent application Ser. No. 15/847,205 entitled "PHASE SHIFT KEYED SIGNALING TONE" filed Dec. 19, 2017.

In some cases described in these filings, the sonic tones may be sonic, i.e., signals that are outside the range of human hearing or other signals not otherwise detectable by humans. For example, in some embodiments, the sonic tone may be generated by frequencies near to 20,000 Hz or less than 20 Hz, or in a frequency band near to 20,000 Hz or near to 20 Hz which is generally sonic. The sonic tone may be the form of a modulated code, as described in the above-referenced patent applications, which is a series of logic 0s and 1s. The modulated code may be repeatedly and periodically output by the sound source, enabling the networkable device 1002 to identify and demodulate the modulated code in the sonic tone to determine the logical series of 0s and 1s associated with the sonic tone. In some embodiments, the logical series of 0s and 1s may be, for example, a coded identifier which can be transmitted to a content management system via various communications protocols.

As used herein, the term sonic tone is used to broadly refer to any type of acoustic signal, code, frequency, waveform, or otherwise that may be transmitted by an acoustic source and detected by a microphone and decoded by a networkable device 1002. The sonic tone may be processed by the networkable device 1002 by a process or routine passively running on the networkable device 1002 or one which is activated manually by a user of the networkable device 1002.

In one application of the sonic tone described in publication US2015-0113094, the sonic tone encodes data to facilitates ad-hoc networking between a networkable device and another device for internet or BLUETOOTH® (IEEE 802.15.1) communication, including for example networking between "a networkable device and a vehicle, using the vehicles speakers or microphone to send or receive [an] sonic tone and set up a BLUETOOTH® (IEEE 802.15.1) connection, Internet connection, OBD2 connection or any other operative connection between the networkable device and vehicle electronics." It is an object of the present invention to provide a detailed routine for implementation of an ad-hoc networking process as described therein.

SUMMARY OF THE INVENTION

According to one aspect, a networkable device is coupled to a wireless network, by a method including broadcasting a sonic tone encoding a symbol sequence representing a binary message of digitized information useful for implementing connection to the wireless network. The sonic tone can be received and decoded to obtain the digitized information, which is then used to implement a connection between the networkable device and the wireless network.

In specific disclosed embodiments, the sonic tone is a human audible sonic tone, and the wireless network is a wireless IP network such as a Wi-Fi network hosted by a gateway, or a wireless BLUETOOTH® (IEEE 802.15.1) network or other personal area network (PAN) hosted by a master device. Where the network is a Wi-Fi network the digitized information can include a Service Set Identifier (SSID) and/or MAC address for the Wi-Fi hotspot, and optionally password for connection to the wireless IP network, so that a networkable device receiving the sonic tone can obtain the SSID-MAC and optional password for the Wi-Fi network and connect to it. In the case of a BLUETOOTH® (IEEE 802.15.1) or other PAN, the networkable device can obtain a MAC address or other BLUETOOTH® (IEEE 802.15.1) network identifier, and optionally a PIN from the sonic tone, and use those to connect to the PAN. Note: "BLUETOOTH® (IEEE 802.15.1)" networks as referenced herein shall be understood to refer to all versions of the networking protocol marketed by the BLUETOOTH® SIG, including Classic BLUETOOTH®, BLUETOOTH® Low Energy (LE) and any other versions and variations. Further, some BLUETOOTH® (IEEE 802.15.1) pairing environments do not require a PIN if the security requirements for the environment are low. Similarly some Wi-Fi networks do not require a password where security requirements are low. Therefore, the PIN and password are considered optional and may not be used in some cases.) Software installed on the networkable device may permit these connections to be made autonomously and without the use of a standard operating system Wi-Fi network search routine or BLUETOOTH® (IEEE 802.15.1) pairing routine, increasing the convenience of the overall system to the user.

According to a further aspect of the invention, a host device for a wireless network facilitates coupling of networkable devices to that wireless network by broadcasting sonic tones of the kind described, and permits networkable devices which return digitized information embedded in the sonic tone to connect to the wireless network, thus allowing connection to the wireless network in an expedited fashion.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, explain the embodiments of the invention. In the drawings, like reference numbers generally indicate identical, functionally similar, and/or structurally similar elements.

DETAILED DESCRIPTION OF THE INVENTION

Various non-limiting embodiments of the invention are described to provide an understanding of the principles of the structure, function, and use of the content delivery and management systems and processes disclosed herein. One or more examples of these non-limiting embodiments are illustrated in the accompanying drawings. Persons of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of this disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The embodiments disclosed herein are generally directed to beacon iteration formats used to transmit data in a sonic tone, and the configuration of networkable device $1002s$ to detect sonic tones that are thus transmitted. The networkable device 1002 may be configured to then supply, e.g. wirelessly, an indication of the sonic tone that was received to a content management system. Upon receipt of the indication of the received sonic tone from the networkable device 1002, the content management system may provide particular content to the networkable device 1002 based on the particular sonic tone received, as is discussed in detail in the above-referenced prior patent filings.

In further embodiments, a first networkable device may interact directly with a second networkable device to exchange information using human audible acoustic signals, as described in further detail below.

Figure 1:
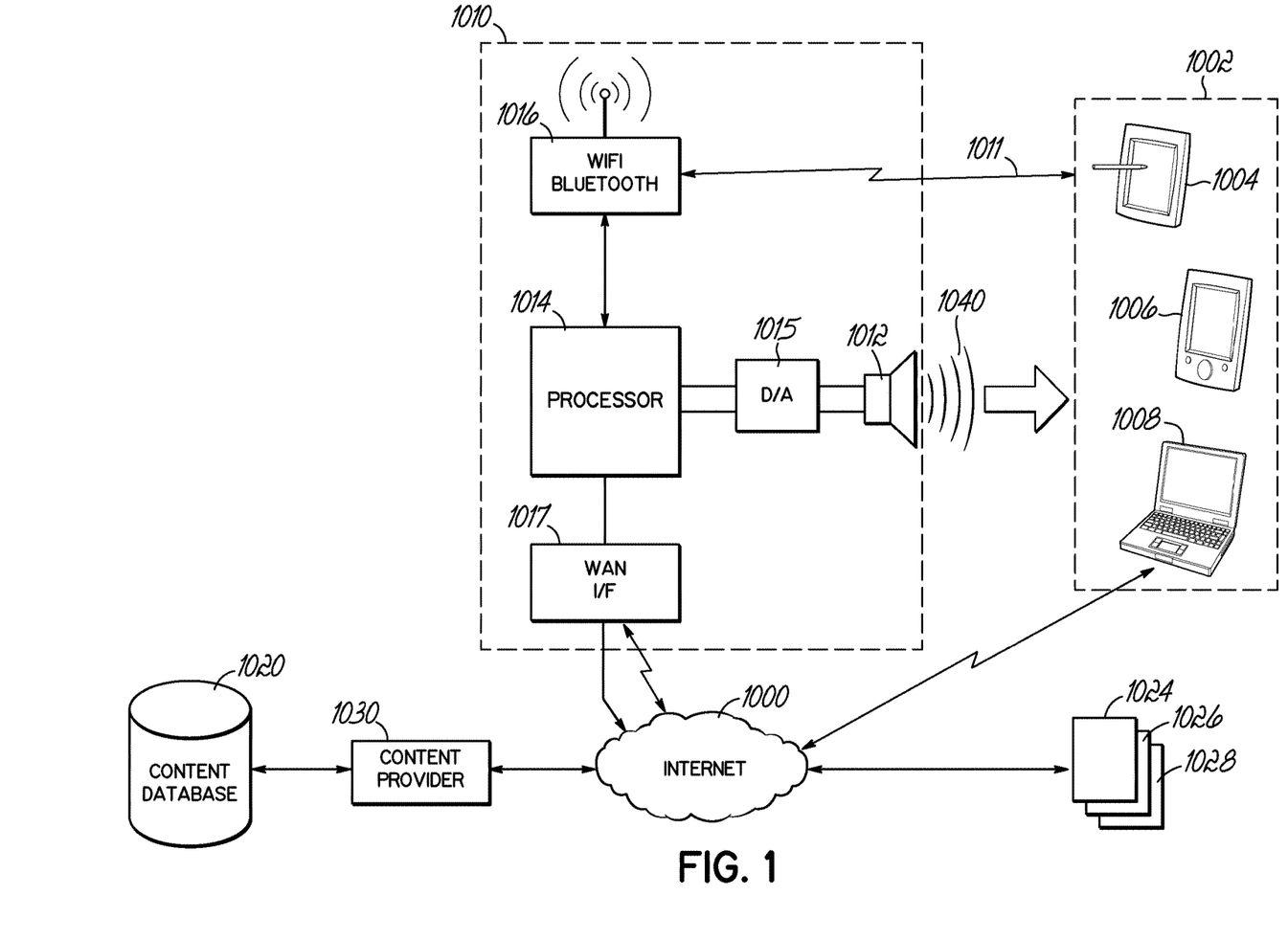
FIG. 1 is a schematic illustration of an example environment in which a networkable device receives a sonic tone and interacts with a source of the sonic tone to form a wireless connection.

FIG. 1 is a schematic illustration of an example environment in which a networkable device 1002 receives content in the form of a sonic tone and uses information in that sonic tone to initiate a wireless networking connection to a host device 1010, so that there can be further wireless interaction with the host device.

A content management system such as 1020, 1030 may be in communication with networkable devices 1002 via an electronic communications network, typically including one or more private networks and the public Internet 1000. The communications network may include a number of computer and/or data networks, including the Internet, LANs, WANs, GPRS networks, etc., and may comprise wired and/or wireless communication links. The networkable devices 1002 that communicate with the content management system may be any type of client device suitable for communication over the network, such as a personal computer, a laptop computer, or a notebook computer, for example.

In some example embodiments, the networkable device 1002 may be one of many possible devices, such as a combination handheld computer and mobile telephone device 1006, sometimes referred to as a smart phone, or another type of computing device such as a tablet computer 1004, laptop or palmtop PC 1008, or other mobile computing devices. It can be appreciated that while certain embodiments may be described in connection with user communication via a smart phone 1006 or laptop 1008 by way of example, the invention may be implemented for other types of user equipment or wireless computing devices such as a mobile telephone, personal digital assistant (PDA), combination mobile telephone/PDA, handheld device, mobile unit, game device, messaging device, media player, or other suitable mobile communications devices. Thus, as illustrated in FIG. 1, example networkable devices 1002 may include, for example, a tablet computer 1004, a smart phone 1006, and a laptop 1008, but other types of networkable devices may be used as would readily be understood by persons of ordinary skill in the art.

Some of the networkable devices 1002 also may support wireless wide area network (WWAN) data communications services including Internet access. Examples of WWAN data communications services may include Evolution-Data Optimized or Evolution-Data only (EV-DO), Long Term Evolution (LTE), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. In each of these cases the networkable devices 1002 may connect to the public Internet 1000 directly so as to provide content on the networkable device or to deliver content to the host device 1010.

Wireless communication 1011 between the host device 1010 and networkable device 1002 can proceed using any number of known protocols therefor, such as wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others.

Wireless communication 1011 between the networkable device 1002 and host device 1010 also may be in accordance with shorter range wireless networks, such as a wireless personal area network (PAN) offering BLUETOOTH® (IEEE 802.15.1) data communications services in accordance with the BLUETOOTH® (IEEE 802.15.1). Special Interest Group (SIG) series of protocols, specifications, profiles, and so forth. Other examples of shorter range wireless networks may employ infrared (IR) techniques or near-field communication (NFC) techniques and protocols, such as electromagnetic induction (EMI) techniques including passive or active radio-frequency identification (RFID) protocols and devices.

The networkable device 1002 may use a variety of applications for allowing a user to accomplish one or more specific tasks. For example, the networkable device 1002 may implement an operating system with functionality for searching for an establishing Wi-Fi communication and functionality for pairing to BLUETOOTH® (IEEE 802.15.1) compliant hosts in a PAN. The operating system may further allow the installation of user-selected application software to provide computing capabilities in accordance with the described embodiments. In addition to communication functions, operating system programs implemented by the networkable device 1002 may include, without limitation, device drivers, programming tools, utility programs, software libraries, application programming interfaces (APIs), and so forth. As is to be appreciated, the networkable device 202 may include any suitable OS, such as a mobile OS (e.g. those sold under the trademarks ANDROID®, BLACKBERRY OS®, iOS®, SYMBIAN OS®, WINDOWS PHONE®, and so forth), a desktop OS (e.g. those sold under the trademarks MAC OS X®, LINUX®, WINDOWS®, GOOGLE CHROME OS®, and so forth) or a television OS (e.g., those sold under the trademarks GOOGLE TV®, APPLE TV®, or another SmartTV OS), for example.

Other networkable devices, such as stationary devices connected to AC mains power and wired networks, are also contemplated as potential users of the methods described herein with respect to networkable devices 1002, and are within the scope of principles of the invention.

In various embodiments, a networkable device 1002 may detect the sonic tone through a generally passive detection process. In other words, a user of the networkable device 1002 does not necessarily have to routinely initiate or activate the detection process. Instead, the detection process may be a background routine that operates in the random access memory (RAM) of a networkable device 1002, for example. The background routine may periodically, or at least routinely, query signals received or generated by various on-board components of the networkable device 1002 in order to detect if a sonic tone is present. These queries may be performed without additional input from the user. Components queried by the detection process may include, without limitation, on-board microphones, on-board speakers, and other audio output ports (such as a headphone output or a line level output, for example).

In the illustrated embodiment, a sonic tone 1040 is generated by a host device 1010 for receipt by the networkable device 1002. The sonic tone may be generated from any suitable loudspeaker 1012 or other audio source. For example, the sonic tone 1040 may be delivered by the speakers included in the audio system of a vehicle, as noted in the priority application noted above. Alternatively, the sonic tone 1040 may be delivered by speakers wired to an in-home audio system or an audio system in a public venue. In each case the sonic tone 1040 can be received, either independently or embedded into other audio content, by a microphone incorporated into or connected to the networkable device 1002. As acoustic signals transmit through the air in a generally omnidirectional reflecting manner, the source may be any audio speaker 1012 within the proximity of the networkable device 1002. The host device may pre-store a sonic tone for broadcasting for purposes of the present invention, or the sonic tone may be generated by an audio generating application of the host device 1010. The host device 1010 may be a mobile or other compact audio device, such as music player, or video player, or the like. Furthermore, while the host device 1010 is illustrated as incorporating a speaker 1012, this is not required; the sonic tone may be provided by such device to a line-out port (such as a headphone jack) connected to an external speaker of the device.

Upon detecting a sonic tone, the networkable device 1002 may process the sonic tone to extract a coded identifier. As noted, the extraction process may be a generally passive process which may be performed by the processor of the networkable device 1002. Thereafter, information coded into the sonic tone may be used to establish a wireless network connection 1011 between the networkable device 1002 and the host device 1010. This may involve the establishment of a Wi-Fi, BLUETOOTH® (IEEE 802.15.1), or other wireless network connection In some embodiments, the networkable device may have its own connection to the public Internet 1000, and in other embodiments, the host device may provide a gateway for Internet communication over the public internet 1000. In either case the networkable device may communicate with any Internet destination and provide content retrieved for presentation on the host device 1010. Internet destinations may include content providing servers 1030 which provide content to networkable devices 1002 obtained from a content database 1020, web servers 1024, music service servers 1026 (e.g., APPLE MUSIC®, AMAZON MUSIC®, etc.) and video content servers 1028 (e.g., NETFLIX®, AMAZON VIDEO®, etc.).

The content obtained by a networkable device 1002 may be in any suitable file format or file type. A non-limiting and non-exhaustive list of example content that may be provided to a networkable device 1002 includes video-based content, audio-based content, image-based content, and text-based content. The content thus retrieved may be presented on the networkable device 1002 screen and/or speakers, or may be presented on a screen and/or speakers of the host device 1010 by delivery of the content over the network connection 1011 established in accordance with principles of the present invention, or video may be presented on the device 1002 screen while audio is presented on the host 1010 speakers, or vice-versa.

Video-based content may include, without limitation, concert footage, music videos, artist interviews, movies, commercials and so forth. Audio-based content may include, without limitation, songs, ringtones, and so forth. Image-based content may include, without limitation, pictures, logos, wallpapers, and so forth. Text-based content may include, without limitation, lyrics, quotes, coupons, passwords, passcodes, email messages, text messages, instant messages, and so forth. In some embodiments, the content may be advertisements or educational in nature. This disclosure is not limited to any particular content which may be delivered to networkable devices 1002 from any Internet source, or the manner in which that content is delivered.

In various embodiments, disclosed with greater elaboration in the priority application, the particular content delivered to a networkable device 1002 may be based on one or more triggers. Over time or based on particular activity of the networkable device 1002 content may be accessible (unlocked) as the networkable device 1002, or user of the device, satisfies various thresholds or requirements. For example, the type of host system to which the networkable device is connected may trigger accessibility of certain content, or the number of times a particular sonic tone has been received by the networkable device 1002 may determine which content is accessible to the device. If the sonic tone is embedded in a song, the number of times the sonic tone is received may indicate the number of times the song has been listened to by a user associated with the device. As the user listens to the song more and more, additional content ("unlocked content") may be delivered to that user's device.

Additional content may be labeled or otherwise considered as "exclusive" content that is only available to certain types or groups of listeners. For example, a sonic tone may be broadcast at a music venue while an artist is performing a concert. Audience members having devices passively detecting for sonic tones will receive and process the sonic tone. The device may then extract the coded identifier and provide the information to a content management system which may match the coded identifier to stored content associated with the performing artist. The content may then be pushed to the networkable device 1002 that originally sent the coded identifier. The user will then be able to access the content via their networkable device 1002. Thus, in the illustrated embodiment, the networkable device 1002 passively detected the sonic tone, extracted the coded identifier, transmitted the coded identifier and received affiliated content without any input or interaction from a user.

In some embodiments, the particular content delivered to a networkable device 1002 may be function of where the device is geographically located. In other words, networkable device 1002s in a first city may be able to receive a first piece of content while networkable device 1002s in a second city networked to the same host device 1010 may receive a second piece of content. Additionally, the content delivered to the networkable device 1002 may depend on other triggers, such as whether the host device is a vehicle of a particular make or model, whether the networkable device 1002 is currently moving (e.g., in a car that is driving), the time of day, user preferences, and so forth.

The content received by the networkable device 1002 may be stored, arranged, and viewed in any suitable configuration. The content may be viewed at the time of receipt or at a later point in time. In one embodiment, content is delivered to an electronic mailbox associated with the user. In one embodiment, content is delivered to an application or module that is executable by the networkable device 1002. A user can execute the application and access the content. Content can be sorted in any suitable hierarchy or schema.

The host device 1010 in accordance with principles of the present invention includes a central processor 1014 for implementing the various functions of the present invention, as well as other entertainment and networking functions as appropriate for the host device's context and intended use. For example in a vehicle the processor may manage, in addition to networking with networkable devices and with an Internet connection, display of content on one or more video displays and the presentation of audio content on speakers such as music or sound that accompanies displayed video.

The processor 1014 is coupled via an audio circuit to loudspeaker 1012. The audio circuit is suitable for presentation of audio provided from processor 1014 onto the loudspeaker, and thus would typically include a digital to analog converter 1015 and associated circuitry.

Processor 1014 is further coupled to a communication circuit 1016 for communication with networkable devices 1002 in accordance with principles of the present invention. Communication circuit 1016 may be a Wi-Fi communication circuit, BLUETOOTH® (IEEE 802.15.1) communication circuit, IRDA (infrared) communication circuit or compliant with any other LAN or PAN communication standard.

Processor may be further coupled to a Wide Area Network (WAN) Interface circuit 1017, which may provide wireless or wired connection to the public Internet 1000. As noted above host device 1010 may provide Internet connectivity to devices 1002 connected to the wireless interface 1016, or the devices 1002 may have their own Internet interface, or the invention may be implemented in a context in which neither the host 1010 or the networkable device 1002 has Internet connectivity (in which case content delivered to the host 1010 over the wireless interface from the networkable device 1002 would be previously stored on the device 1002). The invention is not limited to the particular source of content delivered from the device 1002.

Figure 2:
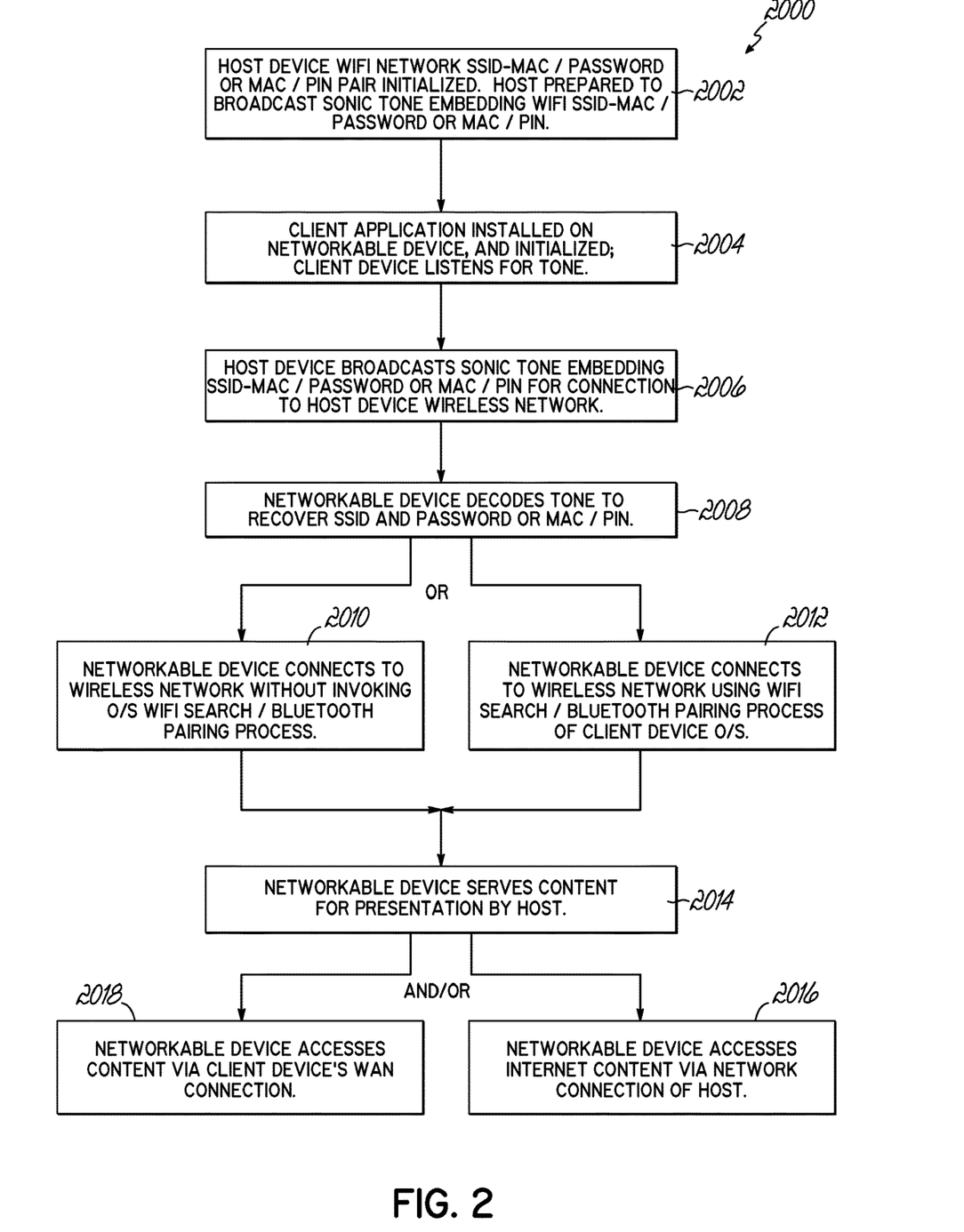
FIG. 2 is a flow chart illustrating a method by which a sonic tone may be generated and passed to a networkable device, according to an embodiment.

FIG. 2 is a flow chart 2000 illustrating a process by which a networkable device such as 1002 (FIG. 1) connects to a network of a host device such as 1010 (FIG. 1) to allow further wireless network communication therebetween.

In a first step 2002, a host device is initialized with a Wi-Fi network SSID and optional password (for a Wi-Fi implementation) or a BLUETOOTH® (IEEE 802.15.1) identifier/MAC and OPTIONAL PIN (for a PAN implementation), and the host is initialized so that it is prepared to broadcast a sonic tone embedding that Wi-Fi SSID and optional password.

In this example, the relevant connection information (e.g., SSID/optional password, MAC/PIN, etc.) is formed as a binary message and encoded into a sonic tone as a sequence of symbols selected from a group consisting of two or more symbols, wherein each symbol is associated with frequency characteristics. The host processor may then generate audio samples of a digitized version of the sequence of symbols using the frequency characteristics associated with the symbols. The audio samples may then be stored in memory. In some embodiments, the audio samples may be stored in a tone file. The tone file may then be broadcast by delivery to an audio circuit such as 1015 (FIG. 1) for playback on a loudspeaker, when a broadcast is triggered. This may be done while other audio is also being played on the loudspeaker, such as (in a vehicle implementation) car radio or in-car entertainment content; alternatively, if there is no content being currently presented on the loudspeaker the sonic tone may be broadcast independently. The sonic tone may use frequencies which are inaudible, or may be selected to use frequencies in the audible range, depending upon preferences for a particular application. In some applications a barely audible tone may be preferred so that a user can confirm the system is operating.

In one application of the present invention, the initialization of the host in step 2002 may be periodically repeated, to change either the password, SSID, MAC or PIN used by the host for wireless connections. Doing so could force re-connection by client networkable devices and thereby evict any connections to devices which are no longer within audible range of the host device. One context where this may prove useful is where the host is in a retail or other public space, and provides a shared Wi-Fi or BLUETOOTH® (IEEE 802.15.1) connection available to all networkable devices within the space; periodic changes to the SSID, password, MAC or PIN would prevent persons outside of that common space from inappropriately permanently attaching to the shared wireless network without being inside of the retail location, since the sonic tone broadcast inside of the location would be acoustically contained and inaccessible outside of that location.

The described process of forced re-connection could also be useful to create logistical data on the duration over which customers are active within a particular location, in a way that may be more accurate than can be obtained from connection times which may overestimate the period over which a customer has remained in a location.

Notably the public location in which the host is installed may be any number of potential locations visited by members of the public bearing mobile devices. For example the public location may be a building lobby, an elevator, a hotel room or meeting room. Furthermore, the host device need not be a conventional router device; the process of the host device may be implemented by any number of other devices having a processor, loudspeaker and networking circuitry, such as a telephone, television, clock radio, BLUETOOTH® (IEEE 802.15.1) speaker device, and the like.

Continuing on FIG. 2, in step 2004 a networkable device is initialized for use with the inventive method by installing an application on the device which is capable of capturing and decoding sonic tone broadcasts. This application is then initialized so that the client device is prepared to listen for a sonic tone broadcast.

In step 2006, the host device broadcasts the sonic tone embedding the SSID/optional password or MAC/optional PIN combination for the host device's wireless network. This may be automatically and periodically done by the host device, if the intention is to create a generally accessible device for any networkable devices within range of the host device speakers. Alternatively, the broadcast of the sonic tone may be triggered by a manual input from a user (e.g., pressing a pairing button or Wi-Fi protected setup (WPS) button on the host device, or the like). Or, certain particular actions may trigger the broadcast, such as starting the engine of the vehicle or placing the vehicle into Park.

In step 2008, the networkable device receives and decodes the sonic tone, using the application installed in step 2004. This step may occur passively as a consequence of the installation of the application, or may occur only when the application is in the foreground of the networkable device display, or is initiated by the user, or triggered by various conditions.

Once the networkable device decodes the sonic tone, the embedded Wi-Fi SSID/optional password or BLUETOOTH® (IEEE 802.15.1) MAC-ID/optional PIN are used to connect to the host wireless network. In some contexts this may proceed via a step 2010 in which the connection is created without the invocation of the networkable device operating system procedure for Wi-Fi connection/BLUETOOTH® (IEEE 802.15.1) pairing. This can be done in those operating systems which permit application control of the Wi-Fi connection parameters/BLUETOOTH® (IEEE 802.15.1) stack. Alternatively, if those functions are not available to application control, then in an alternative step 2012 the networkable device is connected to the wireless network by invoking the operating system Wi-Fi connection/BLUETOOTH® (IEEE 802.15.1) pairing process. In some operating systems this step may require manual intervention by the user, depending upon the operating system requirements. To facilitate the user intervention, the relevant SSID and/or optional password and/or BLUETOOTH® (IEEE 802.15.1) ID and/or optional PIN may be identified in a screen popup for the user, or stored in the clipboard for retrieval by the user via a Paste operation into an operating system dialog box After connection to the host wireless network in step 2014 the networkable device can serve content for presentation on the host, as discussed above.

As noted earlier the host may serve as a gateway for Internet communication by a networkable device. If so, then in step 2016 the networkable device may access the presented content (audio, video, etc.) via the network connection provided by the host. Alternatively, the networkable device may use its own WAN interface to access the presented content. As a third possibility content that has been pre-stored in the networkable device may be presented via the host device.

As described herein, a software application may be executed on a networkable device 1002 to allow a user to wirelessly connect to a host device 1010. The application may also allow that connection to be implemented without user interaction and potentially without use of operating system applications normally used for searching for wireless networks and/or pairing to master devices of a personal area network.

The specific functions of the host device and networkable device are not limited to the embodiments described herein. For example, while in one embodiment the host device may be connected to the entertainment system in a vehicle and the networkable device may be a content providing device in that vehicle, the invention is not so limited. As noted above the host device may take any number of forms or be embedded in any number of devices that have a loudspeaker and/or microphone and wireless networking capability. For example, the host device may be a television, telephone, computer, smartphone, tablet, headphone/headset, smartwatch, Virtual Reality or Enhanced Reality goggle, helmet or system, Internet-of-Things devices or personal assistants such as the Amazon Echo and Echo Dot, Google Home, and/or other fixed or wearable devices capable of wireless connection and/or generation or reception of sonic tones. The networkable device may be any of these devices as well. In particular, a headset may pair with a playback device via the described method, either by the playback device developing and broadcasting the sonic tone via its loudspeaker, or the headset developing and broadcasting the sonic tone via its speakers. Furthermore, headsets or devices may connect to each other wirelessly for intercom functions in a similar manner.

In addition, for use in vehicles, principles of the present invention have applications other than for delivery of content to a vehicle entertainment system. For example, the vehicle may deliver different sonic tones from specific ones of the vehicle speakers, at a low sound pressure level, to cause devices within the vehicle to initiate pairing responses using distinct SSID-MAC-Identifier and/or optional password-PIN combinations based upon the different content in the sonic tones. As a consequence the vehicle infotainment system may be able to identify which mobile devices are positioned in specific locations in the vehicle. Assuming each mobile device is accompanied by a unique passenger, the vehicle may then determine which passenger is located in which seat location in the vehicle, allowing the vehicle to associate various vehicle comfort and entertainment settings with a particular passenger and location. For example, infotainment system settings (sound matrix or directionality), seat position settings and/or temperature settings may be memorized in conjunction with the identity of the device(s) and passenger(s) in a particular location. The vehicle may then re-apply those settings to accommodate the same passenger(s) when their associated device(s) responds to a sonic tone from a different seat inside the vehicle, so that infotainment settings, seat positions, and/or temperature settings are automatically tailored to each passenger even as they take different positions.

In further embodiments, principles of the present invention may be applied to allow other interactions between a vehicle and mobile device, such as the delivery of a vehicle VIN or key number to a mobile device found inside the vehicle, which may be returned to the vehicle later by smart tones or wireless communication from the device to access to a vehicle door, enable a vehicle start button, or permit other vehicle functions. Similar principles can allow access using a mobile device to another secure location. In various use cases the application on the mobile device may respond to a sonic tone by connection to a wireless network followed by delivery via that wireless network of a key that is required unlock the vehicle or secure location. Alternatively the mobile device may produce a sonic tone encoding the key required to unlock or access a location or function. Alternatively, the vehicle or secure location may store the MAC address(es) of one or more mobile device(s) which are trusted, based upon prior pairing of those devices with the vehicle or secure location, such that when the mobile device later connects with a wireless network in the secure location in response to a sonic tone, connection by the MAC address enables unlocking of the vehicle door or other secure location. To enhance security the MAC address or key delivered by a mobile device may be combined with or derived from data from a biometric reader on the mobile device to form a personal biometric that secures the key shared between the mobile device and vehicle or other secure location.

In still further vehicle embodiments, sonic tones which embed payment or coupon information may be produced by a vehicle's infotainment system or other special purpose speakers, to enable direct interaction of the vehicle with drive through payment locations such as parking garages, restaurants, and the like, by delivery of payment information (payment card numbers, or equivalent).

Principles of the present invention may also be used to facilitate networking between a vehicle's on-board computer systems and another networkable device, such as a diagnostic network at a dealership or garage. In this use case a sonic tone is transmitted from a vehicle within a drive-in area or received by a vehicle within a drive-in area, triggering a pairing between the vehicle and a diagnostic or other communication system in that drive-in area, allowing exchange of diagnostic information, vehicle software updating, or the like to occur automatically upon arrival at the drive-in area.

Outside of a vehicle context, sonic tones may be used by any of the noted devices at other point of sale locations equipped to use sonic interaction, to deliver payment information to a register or other sale location.

The invention is further applicable to wearable devices which may be wirelessly connected or paired to other devices using the methods of the invention. A smartwatch, for example, may act as a networkable device and connect to a host device, or may be act as a host device and pair to other devices which act as networkable devices. A hearing aid or activity monitor equipped with a microphone or speaker can also serve as the host or networkable device depending upon available capabilities of the devices and desired use cases.

In addition, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium.

The operation and behavior of the embodiments may be described without specific reference to specific software code or specialized hardware components. The absence of such specific references is feasible, because it is clearly understood that artisans of ordinary skill would be able to design software and control hardware to implement the embodiments based on the specification with no more than reasonable effort and without undue experimentation.

Moreover, the processes associated with the disclosed embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network.

Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions.

It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed:

1. A method of coupling a networkable device to a wireless network and forcing a reconnection of the networkable device at a later time, comprising
   a. enabling a first combination of network identifier, Service Set Identifier (SSID) or Media Access Control address (MAC) and password, shared key or PIN for connection to the wireless network;
   b. broadcasting a first sonic tone which encodes a symbol sequence representing a first binary message, the first binary message including digitized information useful for implementing connection to the wireless network comprising the network identifier, Service Set Identifier (SSID) or Media Access Control address (MAC) and the password, shared key or PIN of the first combination enabled for connection to the wireless network;
   c. receiving the first sonic tone and decoding the first binary message at the networkable device to obtain the first combination of network identifier, SSID or MAC and password, shared key or PIN from the first sonic tone;
   d. using the first combination of network identifier, SSID or MAC and password, shared key or PIN decoded from the first binary message to implement a connection between the networkable device and the wireless network;
   e. enabling a second combination of network identifier, Service Set Identifier (SSID) or Media Access Control address (MAC) password, shared key or PIN for connection to the wireless network;
   f. broadcasting a second sonic tone which encodes a symbol sequence representing a second binary message, the second binary message comprising the network identifier, SSID or MAC and password, shared key or PIN of the second combination enabled for connection to the wireless network;
   g. receiving the second sonic tone and decoding the second binary message at the networkable device to obtain the second combination of network identifier, SSID or MAC and password, shared key or PIN from the second sonic tone;
   h. using the second combination of network identifier, SSID or MAC and password, shared key or PIN decoded from the second binary message to implement a connection between the networkable device and the wireless network; and
   i. disabling the first combination of network identifier, SSID or MAC and shared key or PIN for connection to the wireless network, whereby networkable devices that have not received and decoded and commenced use of the second combination of network identifier, SSID or MAC and password, shared key or PIN are evicted from connection to the wireless network.

2. The method of claim 1 wherein the sonic tone is a human-audible sonic tone.

3. The method of claim 1 wherein the wireless network is a wireless IP network, and the networkable device connects to a wireless IP gateway.

4. The method of claim 3 wherein the networkable device implements an operating system including a Wi-Fi network search routine, and the networkable device connects to the wireless IP gateway identified using the digitized information from a sonic tone without using the Wi-Fi network search routine of the networkable device operating system.

5. The method of claim 3 wherein the first and second sonic tones are produced by the wireless IP gateway and received and used by the networkable device.

6. The method of claim 1 wherein the wireless IP network is an 802.11 Wi-Fi compliant network and the digitized information comprises a Service Set Identifier (SSID) or Media Access Control address (MAC) for connection to the wireless IP network, and the networkable device performs the steps of receiving the first sonic tone and decoding the SSID or MAC from the sonic tone, and then uses the SSID or MAC to connect to the Wi-Fi compliant network.

7. The method of claim 6 wherein the sonic tone further embeds a password or shared key for the 802.11 Wi-Fi compliant network, and the networkable device performs the steps of receiving a sonic tone and decoding the SSID or MAC and shared key or password, and then uses the SSID or MAC and shared key or password to connect to the Wi-Fi compliant network.

8. The method of claim 1 wherein the wireless network is a personal area network (PAN) and the networkable device pairs to a master device of the PAN.

9. The method of claim 8 wherein the personal area network is a BLUETOOTH® (IEEE 802.15.1) compliant PAN and the digitized information comprises a BLUETOOTH® (IEEE 802.15.1) network identifier, and the networkable device performs the steps of receiving a sonic tone and decoding the BLUETOOTH® (IEEE 802.15.1) network identifier from the sonic tone, and then uses the BLUETOOTH® (IEEE 802.15.1) network identifier to connect to the BLUETOOTH® (IEEE 802.15.1) compliant PAN.

10. The method of claim 9 wherein the BLUETOOTH® (IEEE 802.15.1) network identifier is a media access controller (MAC) address of the master device of the BLUETOOTH® (IEEE 802.15.1) compliant PAN.

11. The method of claim 9 wherein the sonic tone further embeds a PIN, and the networkable device performs the steps of receiving a sonic tone and decoding the BLUETOOTH® (IEEE 802.15.1) network identifier and PIN, and then uses the BLUETOOTH® (IEEE 802.15.1) network identifier and PIN to connect to the BLUETOOTH® (IEEE 802.15.1) compliant PAN.

12. The method of claim 9 wherein the networkable device implements an operating system including a BLUETOOTH® (IEEE 802.15.1) pairing routine, and the networkable device pairs to the PAN identified using the digitized information from a sonic tone without the use of the pairing routine of the networkable device operating system.

13. The method of claim 8 wherein the first and second sonic tones are produced by a master device of the PAN and received and used by the networkable device.

14. A wireless network host providing an expedited interface for coupling a networkable device to a wireless network and forcing a reconnection of the networkable device at a later time, comprising
   a. a processor for enabling a combination of network identifier, Service Set Identifier (SSID) or Media Access Control address (MAC) and password, shared key or PIN for connection to the wireless network, and encoding a symbol sequence representing a binary message into a sonic tone, the binary message including digitized information useful for implementing connection to the wireless network comprising said combination of a network identifier, Service Set Identifier (SSID) or Media Access Control address (MAC) and password, shared key or PIN;
   b. an audio circuit for driving an audio system to broadcast the sonic tone; and
   c. a wireless networking circuit coupled to the processor, for receiving connection requests from wireless devices, the networking circuit under control of the processor capable of enabling or disabling a combination of network identifier, SSID or MAC and password, shared key or PIN, and permitting connection to the wireless network by networkable devices providing a combination enabled by the processor;
   d. wherein the processor is programmed to implement a change in at least one of a network identifier, SSID or MAC, and password, shared key or PIN by encoding a first combination of network identifier, SSID or MAC and password, shared key or PIN in a first sonic tone and controlling the wireless networking circuit to enable the first combination, and subsequently encoding a second sonic tone with a second combination of a password, shared key or PIN and password, shared key or PIN, at least one of which is different from the network identifier, SSID or MAC and password, shared key or PIN encoded in the first sonic tone and controlling the wireless networking circuit to disable the first combination and enable the second combination, whereby networkable devices not using of the second combination are evicted from connection to the wireless network.

15. The wireless network host of claim 14 wherein the sonic tone is a human-audible sonic tone.

16. The wireless network host of claim 14 wherein the wireless network is a wireless IP network, and further comprising a wireless IP gateway, the wireless device connecting to the wireless IP gateway.

17. The wireless network host of claim 16 wherein the sonic tone is produced by the wireless IP gateway.

18. The wireless network host of claim 14 wherein the wireless IP network is an 802.11 Wi-Fi compliant network and the digitized information comprises a Service Set Identifier (SSID) or Media Access Control address (MAC) for connection to the Wi-Fi compliant network.

19. The wireless network host of claim 18 wherein the sonic tone further encodes a password or shared key for the 802.11 Wi-Fi compliant network.

20. The wireless network host of claim 14 wherein the wireless network is a personal area network (PAN) and further comprising a master device of the PAN.

21. The wireless network host of claim 20 wherein the personal area network is a BLUETOOTH® (IEEE 802.15.1) compliant PAN and the digitized information comprises a BLUETOOTH® (IEEE 802.15.1) network identifier to connect to the Bluetooth compliant PAN.

22. The wireless network host of claim 21 wherein the BLUETOOTH® (IEEE 802.15.1) network identifier is a media access controller (MAC) address of the master device of the BLUETOOTH® (IEEE 802.15.1) compliant PAN.

23. The wireless network host of claim 21 wherein the sonic tone further embeds a PIN to connect to the BLUETOOTH® (IEEE 802.15.1) compliant PAN.

24. The wireless network host of claim 20 wherein the sonic tone is produced by the master device of the PAN.

* * * * *